Sept. 17, 1968  A. L. HUBBARD  3,401,510
BLOWER ELEVATOR DEVICE

Filed April 6, 1966  2 Sheets-Sheet 1

INVENTOR.
A.L. HUBBARD
BY William A. Murray
ATTORNEY

Sept. 17, 1968
A. L. HUBBARD
3,401,510
BLOWER ELEVATOR DEVICE
Filed April 6, 1966
2 Sheets-Sheet 2
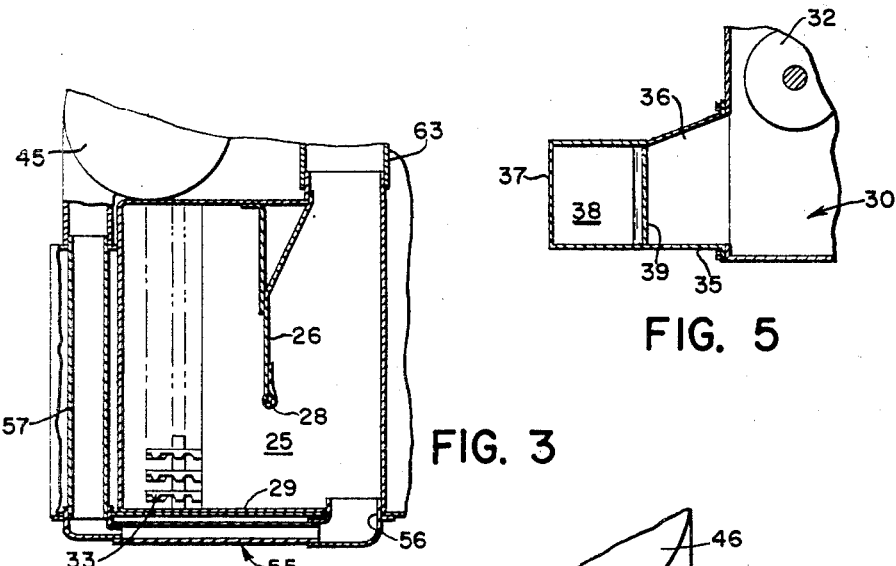
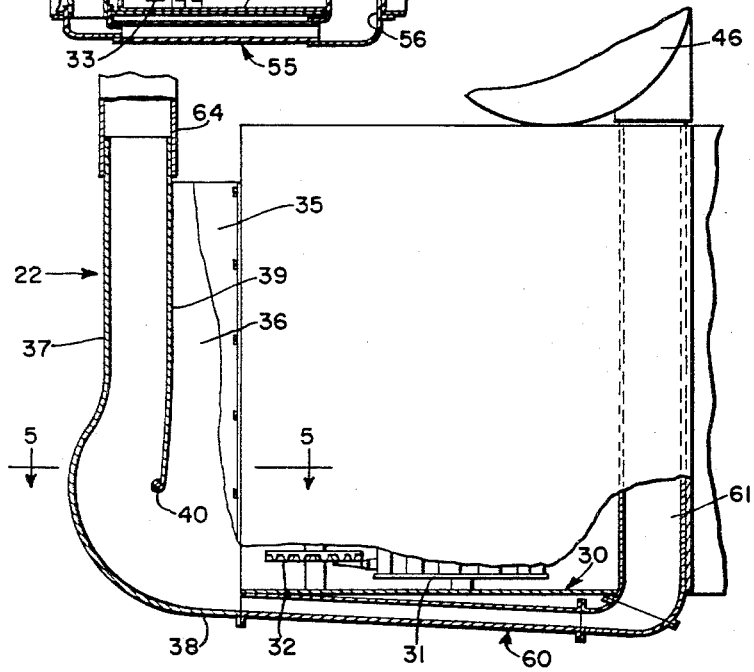
INVENTOR.
A.L. HUBBARD
BY William A. Murray
ATTORNEY United States Patent Office 3,401,510
Patented Sept. 17, 1968

3,401,510
BLOWER ELEVATOR DEVICE
Arthur Lowell Hubbard, Des Moines, Iowa, assignor to Deere & Company, Moline, Ill., a corporation of Delaware
Filed Apr. 6, 1966, Ser. No. 540,587
4 Claims. (Cl. 56—30)

This invention relates to a cotton harvester and more particularly to a blower-type discharge that receives cotton bolls from the harvesting mechanism of the harvester and dispatches the bolls to a receptacle.

It has been conventional for many years to discharge ripened cotton bolls from cotton harvesters by means of large air ducts that extend from the harvesters to a cotton receptacle or basket. There is a suction created in the conduits so that the cotton is actually sucked from the area of the harvester and blown into the basket. A blower is provided at a midpoint of the ducts leading from the harvester to the basket and draws air through suitable ducts extending down to the harvesters and blows air through suitable ducts extending to the baskets.

With the above in mind, it is the purpose of the present invention to incorporate a single blower that drives air through a duct system that passes adjacent the harvester and picks up the harvested cotton by induced air means and continuously blows the cotton through ducts extending from the harvester to the basket.

Specifically, it is the object of the invention to provide as a part of the duct system a horizontally disposed duct that is fixed to the harvester beneath the floor of the harvester and has one end opening into the bottom of the compartment that receives the ripened cotton bolls. The opposite end of the horizontal duct is connected to a duct leading from the blower and consequently air is blown through the aforementioned compartment vertically and upwardly into and through a port at the top of the harvester housing and from thence into a vertically extending conduit that leads to the cotton receptacle.

In one form of the invention the compartment that receives the cotton is adjacent the forward end of the harvester and in another form of the invention it is to the rear of the harvester. In both instances a vertically disposed conduit extends from the blower alongside in one case the forward wall structure of the harvester housing and in the other case the rear wall structure of the cotton harvester housing to the horizontally disposed ducts positioned in underlying relation to the floor structure of the harvester.

Other objects and advantages of the invention will become apparent to those skilled in the art as the nature of the invention is better understood from the following description and as shown in the accompanying drawings.

FIG. 3 is a sectional view taken substantially along the line 3—3 of FIG. 2.

FIG. 4 is an enlarged sectional view taken substantially along the line 4—4 of FIG. 2.

FIG. 5 is a sectional view taken substantially along the line 5—5 of FIG. 4.

Figure 1:
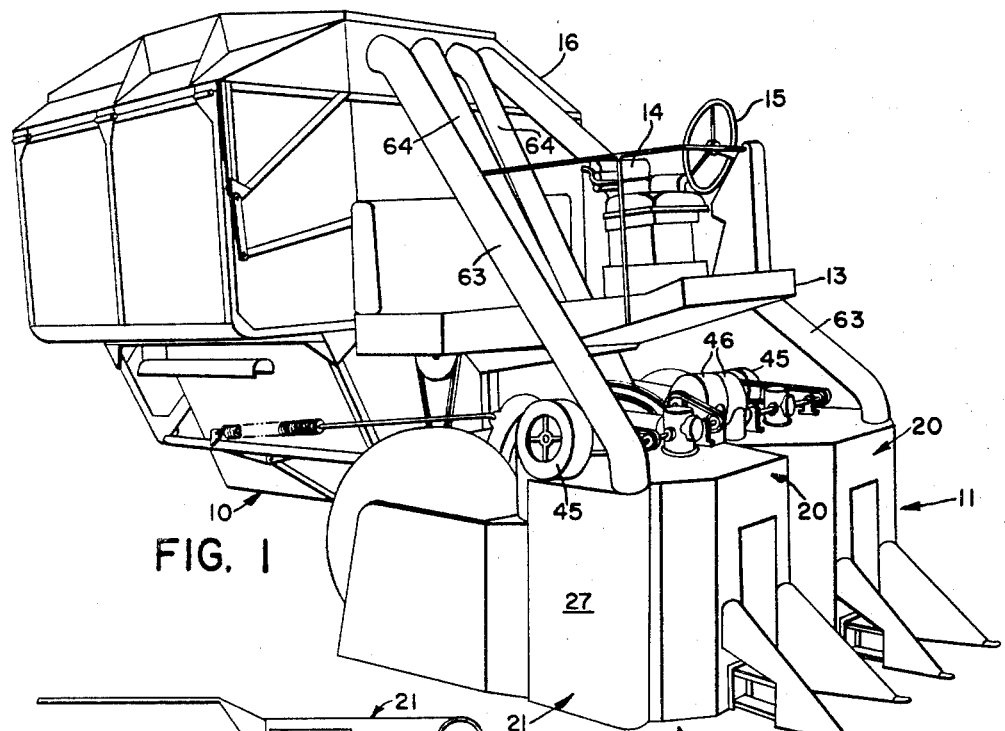
FIG. 1 is a front and side perspective view of a cotton harvester and the main vehicle which supports the harvester.
Figure 2:
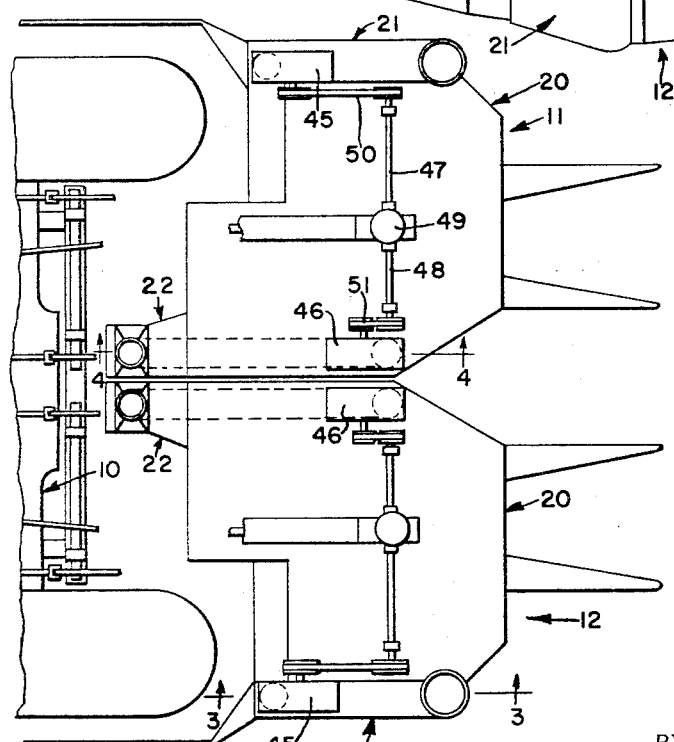
FIG. 2 is a plan view of the harvesting mechanism shown in FIG. 1 with a portion of the main supporting vehicle also being shown.

The cotton harvester is normally supported on a main mobile vehicle, here shown in its entirety by the reference numeral 10. A pair of harvesting units 11, 12 is carried on the vehicle in a forward relation therto. Spaced above and in overlying relation to the harvesting units 11, 12 is an operator's platform 13 with an operator's station 14 and various controls such as a steering wheel 15 mounted thereon. A receptacle or basket 16 is supported on the vehicle rearwardly of the operator's platform 13.

Each of the harvesting units 11 and 12 includes a large centrally located inner casing 20 that contains a pair of harvesting units offset to opposite sides of a row of cotton plants over which the harvester is moving and a pair of outer casings 21, 22, the outer casings 21 being disposed on the outboard side of the harvesters and the casings 22 being disposed centrally and rearwardly of the respective casings 20 so as to pass between adjacent rows of cotton as the harvester advances. Conventionally the outer casings 21 are hinged to swing outwardly about an upright axis and are consequently referred to as a door structure. Following the same reasoning, the casings 22 are then referred to as the inner door structures. The inner casings 20 are upright box-like structures having front, rear, and outer side walls. One outer side wall 25 is common to both and separates the inner casing 20 from the outer casing 21. The upright wall 25 terminates forwardly of the rear wall of the inner and outer casings at 20, 21 so as to form an upright material passage between the inner casing 20 and the outer casing 21. A partition panel 26 extends outwardly from the wall 25 to the outer wall 27 of the outer casing 21 so as to divide the outer casing into a first or rear compartment opposite to and in communication with the material passage to the rear of the panel 25 and a second compartment forwardly of the panel 26. The lower edge 28 of the partition panel 26 terminates vertically and spacedly above a floor structure at the base of the respective casings 20, 21 so as to define an opening common to and between the compartments forwardly and rearwardly of the panel 26. Referring to FIG. 3, the floor panel 29 is only part of the floor structure 30 that underlies the inner and outer casings. In many instances the floor structures 30 that underlie harvesting mechanism such as is shown at 31, 32, and 33 is open so as to permit trash to pass out of the casing and also to permit the proper movement of air within the casing.

Details of this nature are not considered important for purposes of completely understanding the present invention, and consequently are not shown nor described in detail.

Referring now to FIG. 4, the outer casings 22 inboard of the respective rows are positioned rearwardly of the main casings 20. Each casing 22 is composed of a pair of upright transversely spaced apart walls 35, 36 that opens into the main casing 20 and receives cotton through a discharge passage rearwardly of the doffing drum 32. The walls 35, 36 are interconnected at their rear edges by a transverse panel 37 that curves downwardly and forwardly at its lower portion to form a floor 38 for the casing. A partition panel 39 extends across the casing and partitions the casing into a front compartment and a rear compartment. The lower edge 40 of the partition panel 39 is spaced vertically from the floor 38 so as to provide a common opening between the front and rear compartments of the casing.

Blowers or fans 45, 46 are supported on the upper surface of the respective harvesting units 11, 12. The fans 45 are positioned above the door structure 21 and the fans 46 are positioned forwardly of the door or panel casings 22 and at the forward end of the respective harvesting units 11 and 12. The blowers 45, 46 are driven by transverse drive shafts 47, 48 that extend outwardly from a gear box 49. The gear boxes 49 receive their power from the power take-off shaft of a tractor through a suitable drive, not shown. The outer ends of the respective shafts 47, 48 are drivingly connected to blowers 45, 46 by means of chain or belt drives 50, 51.

Supported on the housing structures of the harvesting units 11, 12 are horizontal fore-and-aft extending blower ducts 55 that are positioned beneath the floor 29 and have duct outlets 56 opening into the base of the outer casing 21 and directed upwardly through the compartment forwardly of the partition 26. The rear end of the duct 55 terminates rearwardly of the outer casing 21 and opens upwardly to a connecting conduit 57 that extends from the blower 45 to the horizontal duct 55. Again referring to FIG. 4, it will be noted the floor 38 is slightly beneath the floor structure 30 of the harvester. A fore-and-aft extending blower duct 60 is positioned beneath the floor structure 30 and has a rear open end directed rearwardly so that air moving through the duct 60 may pass onto the floor 38 and from thence upwardly into the compartment defined by the vertical panels 37, 39. The lower end of the panel 37 is curved so that air moving onto the floor 38 is directed in a stream upwardly behind the partition panel 39. The forward end of the horizontal duct opens upwardly and is connected to a vertical duct 61 that in turn is connected directly to the forward blower 46.

Outer conduits 63 extend from the forward ends of the outer casings 21 into the cotton receptacle 16. Inner conduits 64 extend from the inner casings 22 to the cotton receptacle 16. Referring to FIGS. 3 and 4, it will be noted that the lower ends of the conduits 63 are connected to the respective outer casings at their forward ends and in the forward compartments, and directly above the lower duct openings 56. For this reason, air moving from the fan 45 will move through the conduit 55 and be directed upwardly and to the base or lower end of the conduit 63. Such movement of air will create an induced flow of air and cotton through the opening between the lower edge 28 of the partition panel and the floor 29. Consequently, cotton moving into the rearward compartment will be drawn upwardly and into the stream of air moving from the outlet 56 into the base of the conduit 63. Similarly, the inner conduits 22 will receive the air from the respective blowers 46, via the ducts 60, 61. The air will be guided upwardly through the compartment in the casing 22 rearwardly of the partition panel 39. Generally no air will be driven into the portion of the casing forward of the partition panel 39. As the stream of air moves through the rear compartment, it will effect an induced flow of material into the stream of air from the front compartment and consequently the ripened cotton bolls moving into that compartment will be drawn into the stream of air.

While only one form of the invention has been shown, it should be recognized that other forms and variations will occur to those skilled in the art. Therefore, while the preferred form was shown in concise and detailed manner so as to adequately describe the invention, it should be recognized that there is no intention to limit or narrow the invention beyond the broad concepts set forth in the appended claims.

What is claimed is:

1. In a cotton harvester including an upright fore-and-aft extending panel structure with upright front and rear wall means and a horizontally disposed floor structure, the panel structure including an inner casing and an outer casing with an upright material passage between the casings, the outer casing having an upright partition panel dividing the outer casing into first and second compartments with the lower edge of the partition panel being spaced from the floor structure so as to define an opening common to and between the compartments, the first compartment being opposite to and in communication with the material passage; harvesting mechanism in the inner casing for removing cotton from the plants and dispatching it to the first compartment via the material passage; a blower supported on the harvester; a fore-and-aft extending blower duct supported in underlying relation to the floor structure with opposite ends adjacent the aforesaid front and rear wall means of the panel structure with one of the duct ends directed into the base of the second compartment; first conduit means connecting the other of the duct ends to the blower; second conduit means connected to and opening into the top of the second compartment whereby air will move in a stream from the duct end directed into the second compartment to the second conduit means and will effect an induced air flowage between the first and second compartments via the common opening between the compartments.

2. The structure as set forth in claim 1 characterized by the outer casing being outboard of the inner casing and being elongated in a fore-and-aft direction with the second compartment being forward of the first compartment, and the first conduit means includes a vertical duct adjacent and rearwardly of the rear wall means of the panel structure and is connected to the rear of said opposite ends of the blower duct.

3. The structure as set forth in claim 1 characterized by the outer casing being to the rear of the inner casing and with the second compartment being rearward of the first compartment, and the first conduit means includes a vertical duct disposed forwardly of the front wall means and is connected to the forward of said opposite ends of the blower duct.

4. The structure as set forth in claim 1 characterized by the panel structure including upper horizontal panels for closing the upper sides of the casings and the blower is supported on part of the horizontal panels.

References Cited
UNITED STATES PATENTS

| 1,885,437 | 11/1932 | Harazin | 302—21 |
| 2,741,888 | 4/1956 | Hamel et al. | 56—12 |
| 2,912,285 | 11/1959 | Hubbard | 56—30 XR |
| 3,114,227 | 12/1963 | Morkoski | 56—12 |

RUSSELL R. KINSEY, *Primary Examiner.*